United States Patent
Kasha, Jr.

(10) Patent No.: US 6,213,746 B1
(45) Date of Patent: Apr. 10, 2001

(54) DIE AND PROCESS OF REINFORCING A RESIN WITH FIBERS

(75) Inventor: Edwin E. Kasha, Jr., Evansville, IN (US)

(73) Assignee: Kasha Industries, Inc., Grayville, IL (US)

( * ) Notice: Subject to any disclaimer, the term of this patent is extended or adjusted under 35 U.S.C. 154(b) by 0 days.

(21) Appl. No.: 09/196,617

(22) Filed: Nov. 12, 1998

(51) Int. Cl.⁷ .................................................. B29C 47/04
(52) U.S. Cl. .................. 425/112; 425/110; 425/122; 425/465
(58) Field of Search ......................... 425/122, 465, 425/110, 112

(56) References Cited

U.S. PATENT DOCUMENTS

| | | |
|---|---|---|
| 3,993,726 | 11/1976 | Moyer . |
| 4,041,197 | 8/1977 | Gagné . |
| 4,121,901 | 10/1978 | Bourrain et al. . |
| 4,242,380 | 12/1980 | Courtoy . |
| 4,312,917 | 1/1982 | Hawley . |
| 4,588,538 | 5/1986 | Chung et al. . |
| 4,598,012 | 7/1986 | Miller et al. . |
| 4,680,224 | 7/1987 | O'Connor . |
| 4,728,387 | 3/1988 | Hilakos . |
| 4,783,349 | 11/1988 | Cogswell et al. . |
| 4,900,499 | 2/1990 | Mills . |
| 4,937,028 | 6/1990 | Glemet et al. . |
| 4,957,422 | 9/1990 | Glement et al. . |
| 4,988,278 | 1/1991 | Mills . |
| 4,990,545 | 2/1991 | Hourai et al. . |
| 5,068,061 | 11/1991 | Knobel et al. . |
| 5,133,282 | 7/1992 | Bates et al. . |
| 5,205,898 | 4/1993 | Wilson et al. . |
| 5,213,889 | 5/1993 | Cogswell et al. . |
| 5,234,994 | 8/1993 | Shiraki et al. . |
| 5,268,050 | 12/1993 | Azari . |
| 5,277,566 | 1/1994 | Augustin et al. . |
| 5,298,318 | 3/1994 | Soules et al. . |
| 5,325,457 | 6/1994 | Bottoms, Jr. et al. . |
| 5,409,763 | 4/1995 | Serizawa et al. . |
| 5,433,419 | 7/1995 | Murakami . |
| 5,482,667 | 1/1996 | Dunton et al. . |
| 5,520,867 | 5/1996 | Shirai et al. . |
| 5,529,652 | 6/1996 | Asai et al. . |
| 5,540,797 | 7/1996 | Wilson . |
| 5,582,905 | 12/1996 | Beck et al. . |
| 5,618,367 | 4/1997 | Wilkinson et al. . |
| 5,637,329 | 6/1997 | Abrams et al. . |
| 5,658,513 | 8/1997 | Amaike et al. . |
| 5,660,903 | 8/1997 | Andersen et al. . |
| 5,679,424 | 10/1997 | Skaletz et al. . |

*Primary Examiner*—Richard Weisberger
(74) *Attorney, Agent, or Firm*—Ratner & Prestia (57) ABSTRACT

A die and process of reinforcing a resin with fibers. The die includes a first mold and a second mold positioned with respect to the first mold to define a passageway having an entrance portion, an exit portion, and a mixing chamber situated between the entrance portion and the exit portion. The first mold has a recess and the second mold has a protrusion which extends into the recess of the first mold to angle a portion of the passageway between the entrance portion and the mixing chamber. This angle is generally greater than about 90 degrees with respect to a direction in which the fibers may be drawn along an axis through the entrance portion. A roving of fibers is drawn into the die and through the entrance portion of the passageway. The fibers then pass through the angled portion of the passageway, wherein the fibers are forced to bend, causing the fibers to splay before entering the mixing chamber. As the fibers pass into the mixing chamber, the fibers are homogeneously impregnated with molten resin. The impregnated fibers are then consolidated in the exit portion and extruded from the die.

13 Claims, 5 Drawing Sheets

DIE AND PROCESS OF REINFORCING A RESIN WITH FIBERS

TECHNICAL FIELD

The present invention relates generally to a die and a process of reinforcing a resin with fibers. More particularly, the invention relates to a die and a process of splaying fibers to homogeneously impregnate the fibers with molten resin.

BACKGROUND OF THE INVENTION

Resins such as thermoplastic materials may be used in various applications. For applications in which external forces are exerted on a resin structure, it is desirable that the resin structure be reinforced with fibers such as fiberglass. Reinforcing a resin structure in this way desirably increases the resistance of the resin structure to such external forces. Moreover, fiber reinforcement of resin is beneficial because it more easily allows the resin to be cut and formed into pellets or other similar structures after the resin solidifies.

A conventional scheme for reinforcing a resin with fibers generally entails drawing a continuous bundle or roving of fibers into a molded die, wetting the fibers with molten resin within the die, extruding the wetted fibers from the die, and cooling the extruded fibers to form solidified and reinforced resin structures. These resin structures may then be cut into pellets of desired size for any of various uses, including injection molding. Other more specific uses are described in U.S. Pat. No. 5,268,050, which is incorporated herein by reference.

When a roving of fibers is wetted with molten resin, it is desirable that the molten resin uniformly impregnate the fibers in the roving. That is, not only should the molten resin coat the external surface of the roving, but the resin should also be evenly distributed and interspersed between individual fibers in the roving. Uniform impregnation maximizes reinforcement of the resin structure and yields the most desirable physical properties of such structure. If uniform impregnation is not achieved during the wetting stage, it is likely that fibers in the resulting resin structure will be in physical contact with one another and, hence, free to abrade upon one another. Such physical contact coupled with abrasion may reduce the life of the resulting resin structure, especially when impacted by external forces. Moreover, cutting the resin structure into pellets would simply expose the fiberglass core, so the impact strength of the pellets would be further minimized, if not entirely negated.

Various processes exist for resin reinforcement with fibers, and various processes have been suggested for achieving a thorough impregnation of fibers with molten resin. For example, in U.S. Pat. No. 4,728,387, Hilakos suggests loosening a roving of fibers by passing the roving through tension bars or rolls before or during wetting of the fibers with molten resin. Also, it has been suggested that a roving of fibers may be loosened by passing the fibers through a series of baffles or deflection units, as described by Amaike et al. in U.S. Pat. No. 5,658,513 and by Augustin et al. in U.S. Pat. No. 5,277,566. Glemet et al. provides a similar teaching in U.S. Pat. No. 4,957,422 and U.S. Pat. No. 4,937,028. All four of these patents are incorporated herein by reference.

Notwithstanding the multitude of resin impregnation schemes proposed in the art, achieving a homogeneous distribution of molten resin between and around individual fibers in a roving, as well as removing air trapped between the individual fibers, persist as problems faced by the skilled artisan in achieving reinforced resins with the most desirable physical properties.

BACKGROUND OF THE INVENTION

One aspect of the present invention relates to a die for reinforcing a resin with fibers. The die includes a first mold and a second mold positioned with respect to the first mold to define a passageway having an entrance portion, an exit portion, and a mixing chamber situated between the entrance portion and the exit portion. The first mold has a recess and the second mold has a protrusion that extends into the recess of the first mold to angle a portion of the passageway between the entrance portion and the mixing chamber. This angle is generally greater than about 90 degrees with respect to a direction in which the fibers may be drawn along an axis through the entrance portion.

Another aspect of the present invention relates to a process of reinforcing a resin with fibers using the die described above. According to this process, a roving of fibers is drawn into the die and through the entrance portion of the passageway. The fibers then pass through the angled portion of the passageway, wherein the fibers are forced to bend at an angle generally greater than about 90 degrees with respect to a direction in which the fibers are drawn along an axis through the entrance portion. Bending the fibers in this manner causes the fibers to splay before entering the mixing chamber. As the fibers pass into the mixing chamber, the fibers are impregnated with molten resin. The impregnated fibers are then consolidated in the exit portion and extruded from the die.

Dies and processes according to the present invention are advantageous in that they are capable of converting a relatively inexpensive resin having minimal impact strength to a reinforced resin having impact strength rivaling resins which are typically much more expensive in the raw state. The reinforced resin produced according to the present invention is markedly more impact-resistant than other reinforced resins. This is due primarily to the splaying as described above, in that fibers within the reinforced resin are spread out and in a substantially parallel arrangement with respect to one another, as opposed to a random orientation.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION

Figure 1A:
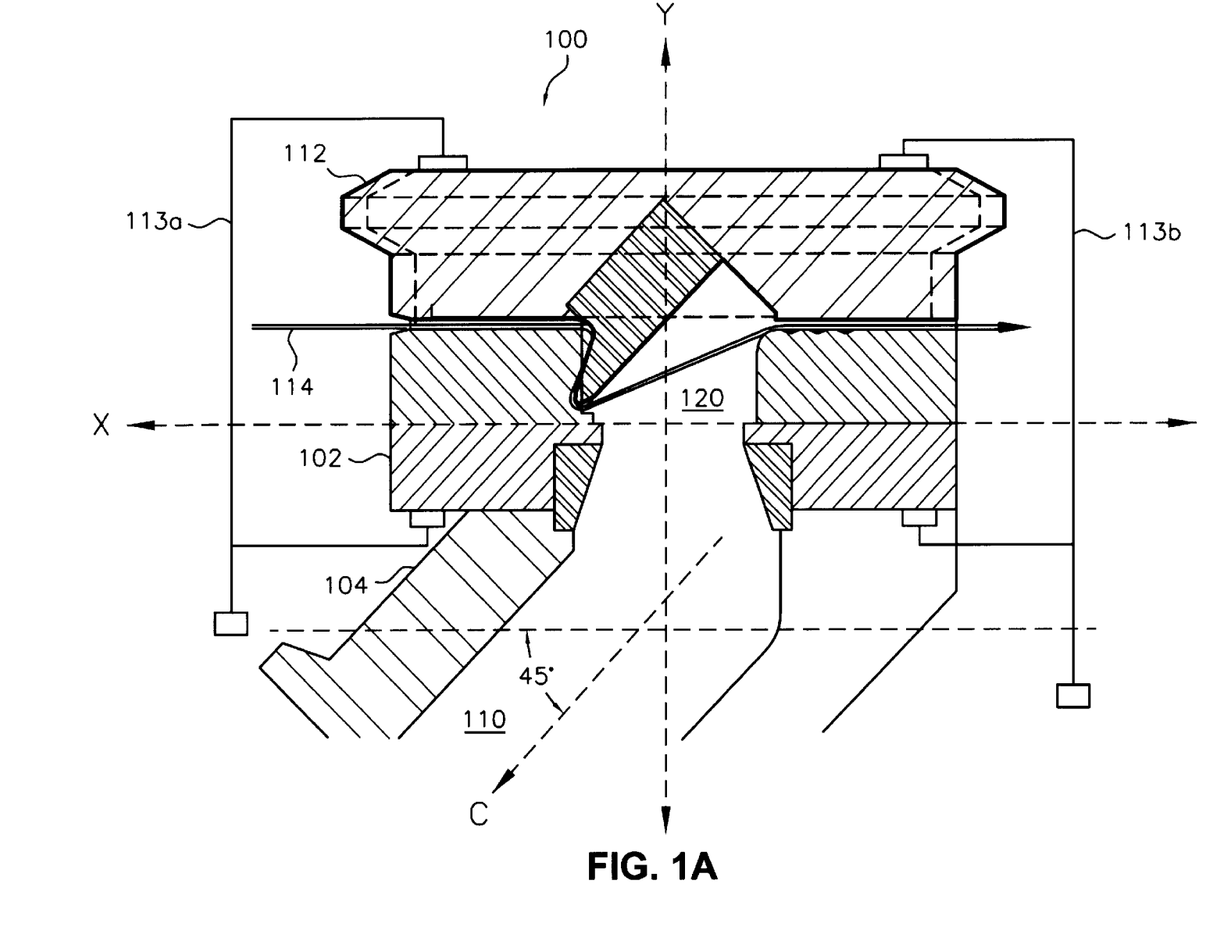
FIGS. 1A and 1B are side views of a die 100 according to an exemplary embodiment of the present invention.

FIG. 1A is a side view of a die 100 constructed for reinforcing a resin such as a thermoplastic material with fibers 114 for pellet extrusion. Die 100 includes a first mold 102, shaped as illustrated in FIG. 1, which lies in a plane "X." First mold 102 may be made of any variety of materials although, preferably, first mold 102 is made of stainless steel. First mold 102 also preferably has hardened wear surfaces. First mold 102 is attached to a cylinder 104, preferably by bolts (not shown). Cylinder 104 defines a channel 110 through which resin may flow. Cylinder 104 has a longitudinal axis "C" which is angled with respect to the "X" plane preferably by about 45 degrees, as illustrated in FIG. 1.

Die 100 further includes a second mold 112, also preferably made of stainless steel and having hardened wear surfaces. Second mold 112 is essentially a die extension in the form of a "cap." Second mold 112 is preferably connected to first mold 102 by a pair of C-clamps 113a, 113b which, when closed, lock second mold 112 in position with respect to first mold 102, but may be easily opened. As such, if a fiber strand breaks while passing through die 100, a user may temporarily stop the extrusion process, simply "pop" open C-clamps 113a, 113b to cantilever second mold 112 from first mold 102, re-thread the fiber, and then continue with the extrusion process. As an alternative or addition to C-clamps 113a, 113b, second mold 112 may be permanently attached to first mold 102 by bolt fittings (not shown).

Figure 1B:
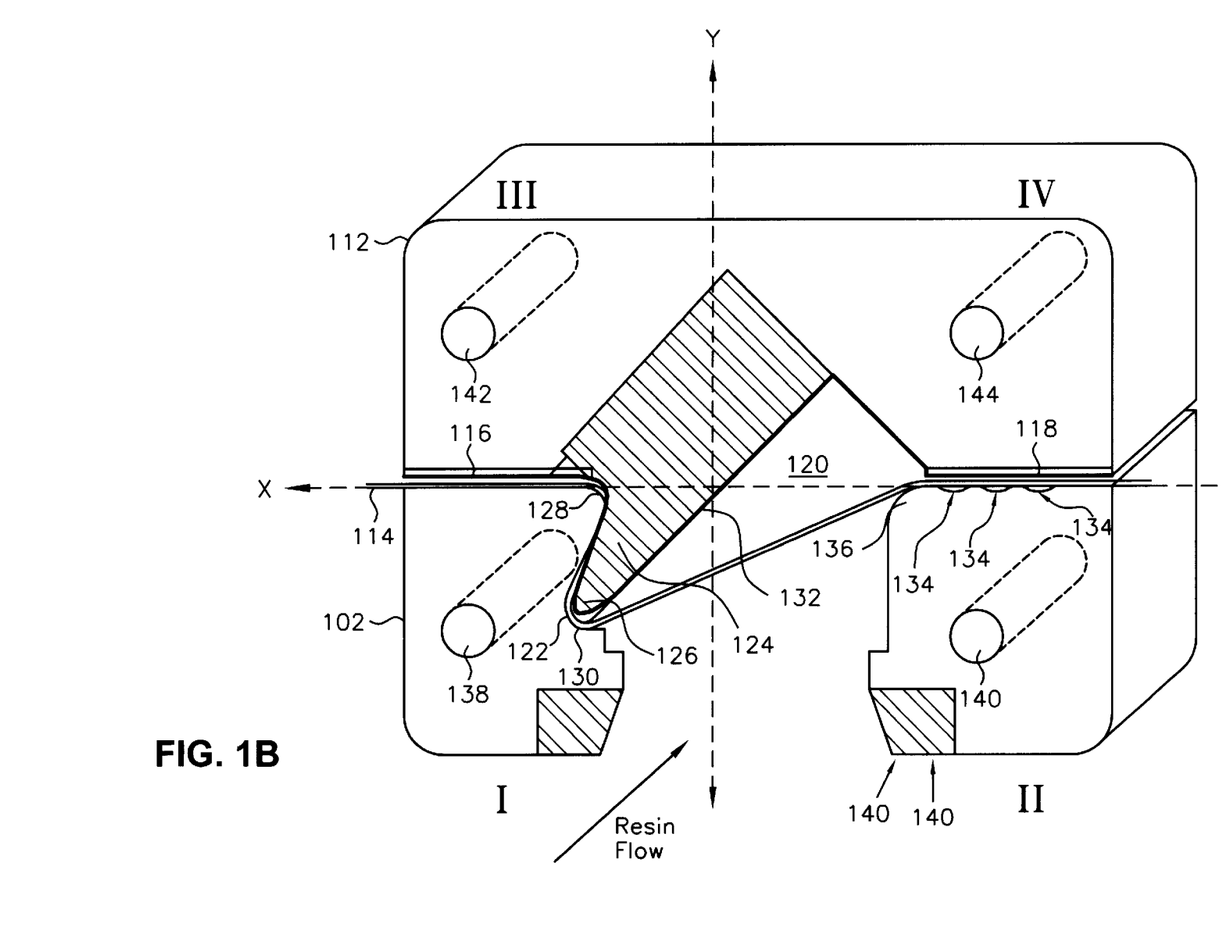

As shown in FIG. 1B, second mold 112 is positioned with respect to first mold 102 to define a passageway through which a roving of fibers 114 may be drawn. This fiber passageway includes an entrance portion 116 through which fibers 114 are drawn upon entering die 100, and an exit portion 118 through which fibers 114 are drawn before being extruded from die 100. Preferably, the cross-sectional area of entrance portion 116 is slightly larger than the cross-sectional area of exit portion 118, as described in the example below. Alternatively, entrance portion 116 may have a cross-sectional area approximately equal to the cross-sectional area of exit portion 118 of the passageway. The fiber passageway further includes a mixing chamber 120 situated between entrance portion 116 and exit portion 118. As illustrated in FIG. 1A, mixing chamber 120 communicates with resin channel 110, so fibers 114 may be impregnated with molten resin flowing into mixing chamber 120 from resin channel 110. Mixing chamber 120 preferably has a cross-sectional area larger than the respective cross-sectional areas of both entrance portion 116 and exit portion 118 of the passageway.

In FIG. 1B, first mold 102 has a recess 122, and second mold 112 has a protrusion 124 which extends into recess 122 of first mold 102 in a portion of the passageway between entrance portion 116 and mixing chamber 120. Protrusion 124 is generally wedge-shaped, and has a rounded tip 126 which fits into recess 122. Protrusion 124 cooperates with recess 122 to angle a portion of the passageway by a predetermined angle. This angled portion includes a first bend 128 and a second bend 130. First bend 128 has a curved radius, but generally forms an angle greater than about 90 degrees with respect to a direction in which fibers 114 pass through entrance portion 116, generally along the X plane as shown in FIG. 1A. For example, the angle of the first bend may be about 120 degrees. Second bend 130 also has a curved radius, and forms an angle preferably less than about 90 degrees with respect to a direction in which fibers 114 pass along an axis between first bend 128 and second bend 130. For example, the angle of the second bend may be about 40 degrees.

Most areas of the fiber passageway within the angled portion preferably have cross-sectional areas smaller than the cross-sectional area of entrance portion 116. Moreover, the cross-sectional area of the angled portion preferably decreases along the passageway from first bend 128 towards second bend 130. This decrease in cross-sectional area preferably occurs closer to first bend 128 than second bend 130, although a gradual decrease between the bends is also contemplated within the scope of the present invention.

In FIG. 1B, protrusion 124 extends from second mold 112 to form a surface wall 132 of mixing chamber 120. Surface wall 132 is angled with respect to the X plane in which first mold 102 lies, preferably by about 45 degrees. Preferably, surface wall 132 is angled substantially parallel with respect to longitudinal axis C of cylinder 104, shown in FIG. 1A, to facilitate resin flow towards exit portion 118.

As shown in FIG. 1B, a portion of first mold 102 which defines a surface of exit portion 118 of the fiber passageway has one or more recesses 134 formed in its surface. Recesses 134 may be formed by shaping a portion of the surface of exit portion 118 substantially as a sine curve, as illustrated in FIG. 1B. Recesses 134 function essentially as resin "reservoirs," in that resin pools will collect in the reservoirs 134 and provide additional wetting of the splayed and impregnated fibers after the fibers are drawn over an edge 136 of first mold 102 and are reconsolidated in exit portion 118. Alternatively, or in addition to recesses 134, a portion of second mold 112 defining a surface of exit portion 118 may similarly have one or more recesses formed in its surface.

Heat may be applied to dies constructed according to the present invention, to maintain thermoplasticity of the resin within mixing chamber 120. In FIGS. 1A and 1B, first mold 102 and second mold 112 are both thermally controlled by the inclusion of heating elements. The heating elements may be any conventional heating means, although heating rods positioned proximate mixing chamber 120 are preferred.

In FIG. 1B, a first heating rod 138 is disposed within first mold 102 in a first quadrant (I) of die 100, a second heating rod 140 is disposed within first mold 102 in a second quadrant (II) of die 100, a third heating rod 142 is disposed within second mold 112 in a third quadrant (III) of die 100, and a fourth heating rod 144 is disposed within second mold 112 in a fourth quadrant (IV) of die 100. Alternatively, a plurality of heating rods may be disposed in respective quadrants. Heating rods 138, 140, 142, and 144 are preferably oriented substantially perpendicular with respect to the X-Y plane, as illustrated in FIG. 1B. Various other angular orientations are contemplated within the scope of the present invention. For example, heating rods 138, 140, 142, and 144 may be or oriented substantially parallel or substantially perpendicular with respect to the X plane or Y plane.

Heating rods 138, 140, 142, and 144 desirably operate at a temperature between about 300 and 750 degrees Fahrenheit, although other temperatures are contemplated within the scope of the present invention. The particular temperature will depend on the desired application, taking into account the type of resin to be used. For example, heating rods 138, 140, 142, and 144 preferably operate at a temperature between 300 and 400 degrees Fahrenheit when polypropylene resin is used. On the other hand, heating rods 138, 140, 142, and 144 preferably operate at a temperature of about 700 degrees Fahrenheit when polycarbonate resin is used.

Positioning the four sets of heating rods 138, 140, 142, and 144 in respective quadrants allows for temperature control in each of quadrants I–IV. For example, the temperature of heating rods 140 and 144 in quadrants II and IV, respectively, may be raised to a somewhat higher temperature than heating rods 138 and 142 in quadrants I and III. Such a temperature differential causes molten resin to be more viscous in portions of mixing chamber 120 proximate exit portion 118 of the passageway than entrance portion 116. In this way, resin flow towards exit portion 118 is facilitated while retrograde resin flow, that is, resin flow from mixing chamber 120, against the direction in which fibers 114 are drawn and into the angled and entrance portions of the fiber passageway, is deterred.

Figure 2:
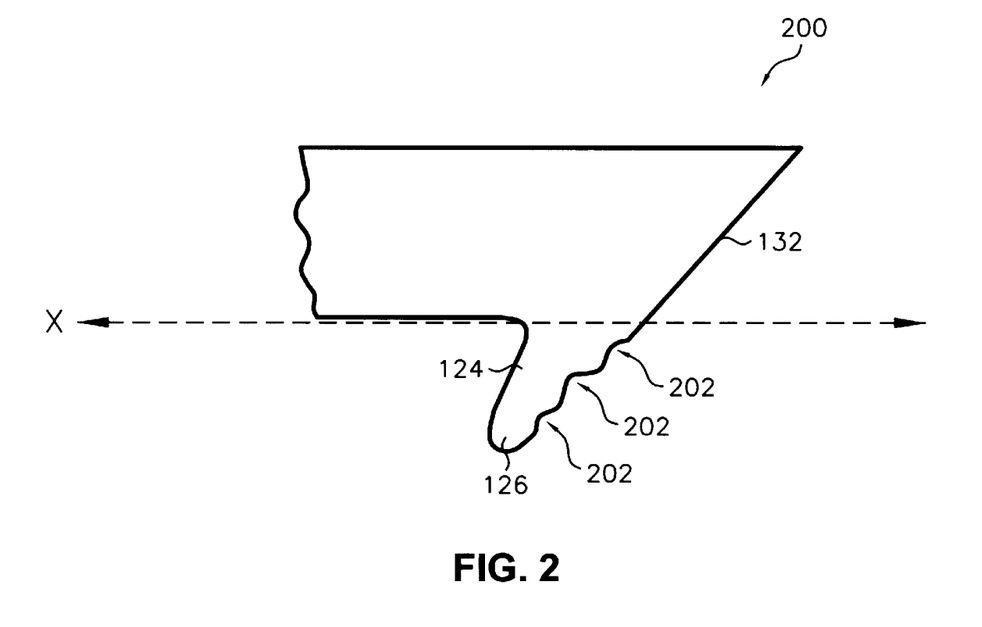
FIG. 2 is a side view of a mold 200 configured to be used in a die according to another exemplary embodiment of the present invention.

FIG. 2 illustrates a second mold 200 constructed in accordance with the present invention. Second mold may be substituted for second mold 112 of die 100, or used in other dies within the scope of the present invention. Second mold 200 is similar to second mold 112 of FIGS. 1A and 1B in most respects. Unlike second mold 112, however, second mold 200 has one or more recesses 202 formed in its a surface. Recesses 202 promote resin flow around and between splayed fibers, particularly if the flow of molten resin from resin channel 110 forces the splayed fibers towards surface wall 132.

Figure 3:
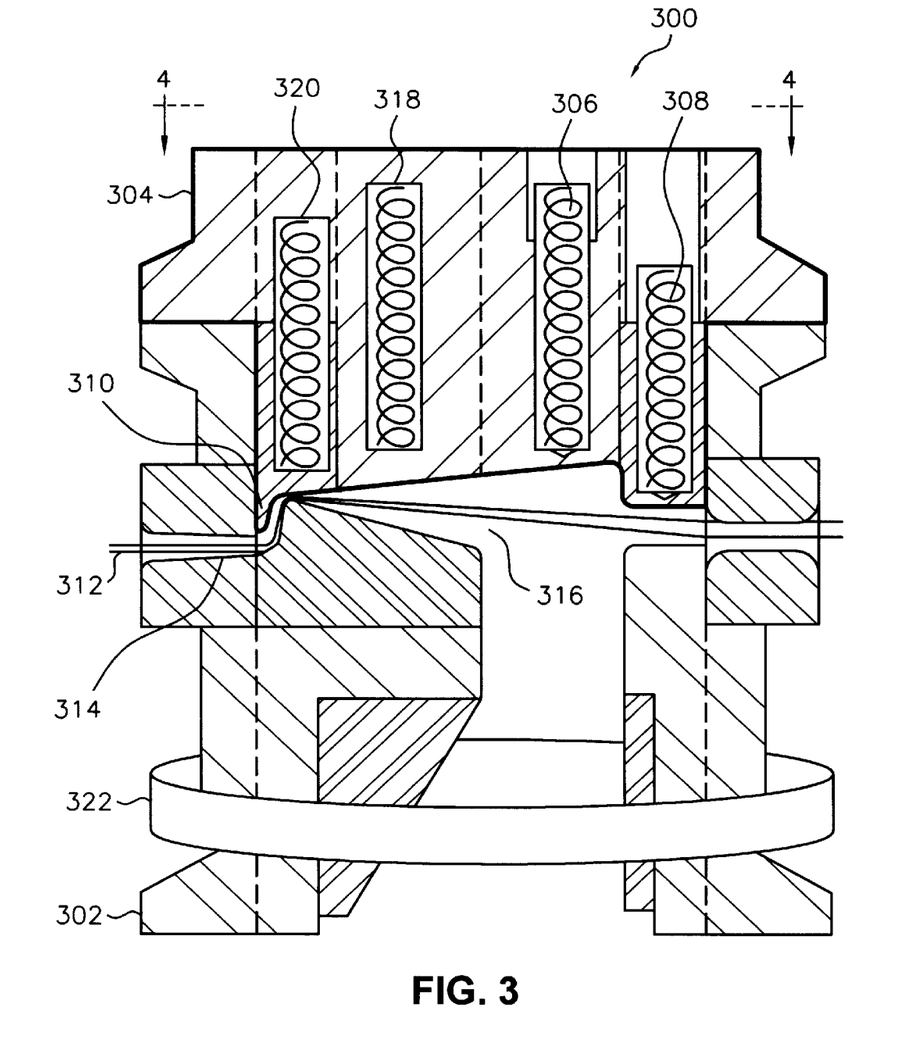
FIG. 3 is a side view of a die 300 constructed according to another exemplary embodiment of the present invention.
Figure 4:
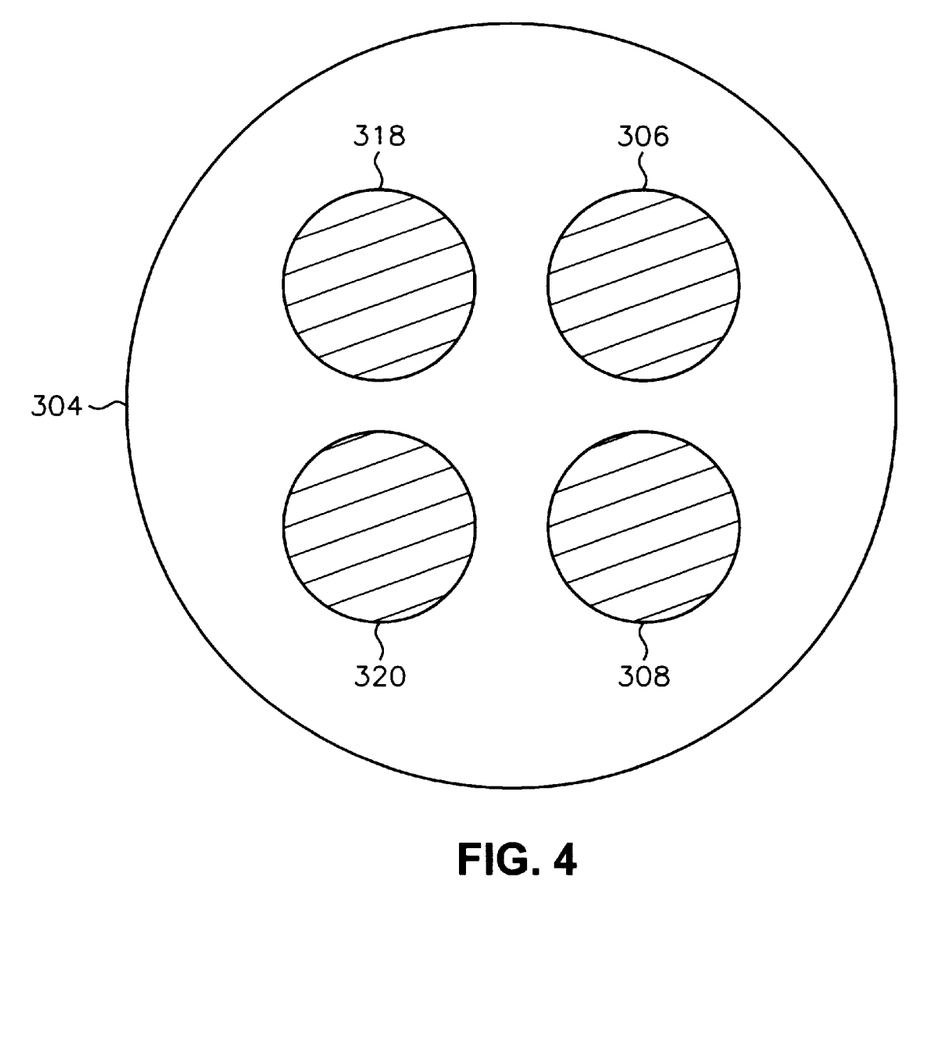
FIG. 4 is a top view of die 300 taken along lines 4—4 in FIG. 3.

In FIG. 3, a die 300 includes a first mold 302 and a second mold 304. Cartridge heaters 306, 308, 318 and 320 are placed in second mold 304 for controlling the temperature within portions of a mixing chamber 316 proximate second mold 304. FIG. 4 illustrates the orientation of cartridge heaters 306, 308, 318 and 320 from a top view of die 300 taken along lines 4—4 of FIG. 3. Die 300 further includes a heating band 322 circumferentially disposed about first mold 302 which controls the temperature of resin flowing into mixing chamber 316.

In FIG. 3, second mold 304 has a protrusion 310 which extends into first mold 302. Protrusion 310 of die 300 does not form as sharp an angle as protrusion 124 of die 100 with respect to the general direction in which fibers 312 are drawn through die 300. Second mold 304 is permanently attached to first mold 302. An entrance portion 314 of a passageway through which fibers 312 pass upon being drawn into die 300, up to and including where fibers 312 pass over protrusion 310, is shaped similar to a stopper of a bottle to provide close surface tolerances. These tolerances facilitate splaying of fibers 312 before fibers 312 enter mixing chamber 316.

Dies constructed according to the present invention are designed to splay, impregnate, consolidate, and extrude any commercially available roving of fibers. There is no limit to the kind of fibers which may be used. The term "fibers" refers to any fibers of a composition in the form of, for example, filaments, strands, yarns, bundles, cords, and the like. The fibers impregnated in dies according to the present invention may be untreated, or treated with anchoring agents or the like to improve bonding to the resin. The fibers may include cut, chopped, or discontinuous fiber lengths as well as continuous filaments. Continuous glass fibers are preferred, such as Owens Corning 111A-AA-250 rovings of K-type fiberglass, having a polyester/vinyl/epoxy binder, or PPG TufRov 4224 rovings of borosilicate N-type fiberglass with a silane binder.

Any molten or thermoplastic resin may be used with dies according to the present invention, such as amorphous types (e.g., polycarbonate, SAN, ABS) and crystalline types (e.g., polypropylene, PBT, nylon). U.S. Pat. No. 5,520,867 (Shirai et al.), U.S. Pat. No. 5,268,050 (Azari), U.S. Pat. No. 4,988,278 (Mills), U.S. Pat. No. 4,957,422 (Glemet et al.), and U.S. Pat. No. 4,728,387 (Hilakos) describe other types of resins which may also be used. These patents are incorporated herein by reference.

There is also no particular limitation with respect to the fiber composition of the reinforced resin structure extruded from dies constructed in accordance with the present invention. In light of the physical properties typically desired for such reinforced resins, however, the fibers are desirably between about 10% to 40% by weight of the total weight of the reinforced resin structure. Fiber compositions closer to about 40% by weight are preferred.

MODE OF OPERATION

A tape or roving of fibers is desirably pre-heated before being drawn into a die according to the present invention. Such pre-heating causes moisture situated on or between the fibers to evaporate, reducing the risk that such moisture would occupy space between the fibers during and after impregnation with molten resin. The fibers may be pre-heated to any temperature and for any length of time sufficient to drive moisture from the fibers. Any radiant heater such as a gas or electric heater over which the rovings could be drawn will suffice.

Referring to FIGS. 1A and 1B by way of illustration, a pre-heated roving of fibers 114 is drawn through die 100 at a predetermined rate, preferably in the range of about 50 feet per minute to about 200 feet per minute. Any conventional drawing equipment (not shown), such as a variable drive belt puller system, will serve this purpose. The rate at which fibers 114 are drawn through die 100 may be varied, and will affect the desired percentage-by-weight of fiber in the reinforced resin structure.

The pre-heated roving of fibers 114 is drawn into die 100 and through entrance portion 116 of the passageway. As fibers 114 are drawn through first bend 128 of the angled portion, fibers 114 are bent at greater than a perpendicular angle, preferably about 120 degrees, with respect to the general direction in which fibers 114 are drawn along the X plane through entrance portion 116. The fibers continue through the angled portion until they reach second bend 130, at which fibers 114 are caused to bend generally at an acute angle with respect to the general direction in which fibers 114 pass between the first and second bends.

By bending fibers 114 in the angled portion of the passageway, torque and tension are exerted on the fibers, causing them to splay. Thus, fibers 114 are forced to spread out and become substantially longitudinally oriented with respect to one another, immediately before entering mixing chamber 120. This splaying is also facilitated by a decrease in cross-sectional area along the angled portion between first bend 128 and second bend 130, as described above. The degrees of torque and tension exerted on fibers 114 will depend on: (i) the angles of the bends defined by protrusion 124 and recess 122 in forming the fiber passageway, (ii) the respective cross-sectional areas within the fiber passageway, as well as (iii) the rate at which fibers 114 are fed through the die, among other factors.

Molten resin is forced into mixing chamber 120 through resin channel 110 as the splayed fibers pass into and through mixing chamber 120. Because fibers 114 are splayed before entering mixing chamber 120 in the manner described, the molten resin is evenly distributed between and around individual fibers to achieve a uniform impregnation. The angles formed by both surface wall 132 and the "C" axis of cylinder 104 with respect to the X plane cooperate to ensure that resin flows towards exit portion 118 of the passageway rather than towards entrance portion 116. Also, both the rates at which (i) resin is forced into mixing chamber 120, and (ii) fibers 114 are drawn through die 100 may be regulated to prevent retrograde molten resin flow.

As splayed and impregnated fibers 114 pass over edge 136 of first mold 102 and into exit portion 118 of the fiber passageway, some excess molten resin is squeezed out of the fibers. The splayed and impregnated fibers are then reconsolidated in exit portion 118, and dipped in resin pools which have collected in recesses 134. In exit portion 118, the fibers are reconsolidated into any desired shape such as a strand, a bar, a ribbon, a tape, a sheet, or a plate and then extruded from die 100 as a reinforced resin structure. The reinforced resin structure is briefly exposed to the air and then pulled through a water bath, which cools and solidifies the structure. The solidified, reinforced resin structure is then pulled through a variable drive belt puller system and through an air wipe apparatus (e.g., a fan) to remove any excess water from the resin. The reinforced resin structure is then pulled between pull rolls of a pelletizer and through a rotating cutter head to make a pellet or other similar structure of desired length.

The pellets produced in accordance with the present invention are reinforced and have high impact resistance suitable for injection molding or as the object of another processing step.

EXAMPLE

In one example of die 100, first mold 102 has a width of about 11⅝ inches, a length of about 7¾ inches, and a depth of about 1⅞ inches. Second mold 112 similarly has a width of about 11⅝ inches (excluding the protrusion), a length of about 7¾ inches, and a depth of about 1⅞ inches. Entrance portion 116 is approximately 3⅜ inches in length, and exit portion 118 is approximately 2.9 inches in length. Protrusion 124 extends approximately 0.5862 inches from second mold 112 at an angle of approximately 120 degrees with respect to the direction in which fibers 114 pass generally along the X axis through entrance portion 116. The curved radii of the first bend 128 and second bend 130 of the angled portion are approximately ⅛ inches each.

In this example, the first and second molds are shaped and positioned with respect to one another such that entrance portion 116 of the passageway has approximately a 3/16 square-inch cross-section, and exit portion 118 of the passageway has approximately a ⅛ square-inch cross-section. In other examples, the cross-sectional area of exit portion 118 may vary depending on the desired percentage of fiber in the extruded resin. The portion of the passageway in which first bend 128 is formed has a cross-sectional area of approximately ⅛ square inches, while the portion of the passageway in which second bend 130 is formed has a cross-sectional area of approximately 1/16 square inches. The cross-sectional area of the passageway decreases from ⅛ square inches to 1/16 square inches from first bend 128 towards the second bend 130. This decrease preferably occurs closer to first bend 128 than second bend 130, as described above.

A roving of PPG TufRov 4224 of borosilicate N-type fiberglass was drawn through this example of die 100. The roving was pre-heated to a temperature between 400 degrees Fahrenheit and 600 degrees Fahrenheit. Mixing chamber 120 was flushed with polypropylene resin, and an end product having approximately 40% fiberglass by weight was produced. The physical properties of the pelletized end product are shown in Table 1.

TABLE 1

Mechanical Properties of Reinforced Polypropylene Resin

| | |
|---|---|
| Specific gravity | 1.21 |
| Tensile Strength | $10.5 \times 10^3$ psi |
| Flex Modulus | $20.8 \times 10^3$ psi |
| Izod | 8.1 (1/8 in. spec. ft. lbs/in.) |

Using the same roving of fibers, mixing chamber 120 was flushed with polycarbonate resin, yielding an end product having approximately 40% fiberglass by weight. The physical properties of the pelletized end product are shown in Table 2.

TABLE 2

Mechanical Properties of Reinforced Polycarbonate Resin

| | |
|---|---|
| Specific gravity | 1.52 |
| Tensile Strength | $23.1 \times 10^3$ psi |
| Flex Modulus | $36.4 \times 10^3$ psi |
| Izod | 5.0 (1/8 in. spec. ft. lbs/in.) |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A die for reinforcing a resin with fibers, the die comprising a first mold and a second mold positioned with respect to the first mold to define a passageway having an entrance portion, an exit portion, and a mixing chamber situated between the entrance portion and the exit portion, the first mold having a recess and the second mold having a protrusion extending into the recess of the first mold to angle a portion of the passageway between the entrance portion and the mixing chamber, the angle generally being greater than about 90 degrees with respect to a direction in which the fibers may be drawn along an axis through the entrance portion.

2. The die according to claim 1 wherein the mixing chamber has a cross-sectional area larger than a cross-sectional area of the entrance portion of the passageway.

3. The die according to claim 1 further comprising a clamp connecting the second mold to the first mold.

4. The die according to claim 1 wherein the first mold includes a heating element.

5. The die according to claim 1 wherein the second mold includes a heating element.

6. The die according to claim 1 wherein the angled portion of the passageway has a cross-sectional area smaller than a cross-sectional area of the entrance portion.

7. The die according to claim 1 wherein the angled portion of the passageway includes a first bend proximate the entrance portion and a second bend proximate the mixing chamber, the angled portion having a decreasing cross-sectional area from the first bend towards the second bend.

8. The die according to claim 1 wherein the protrusion extending from the second mold has a surface defining a wall of the mixing chamber, the surface having a recess formed therein.

9. The die according to claim 1 wherein the protrusion extending from the second mold has a surface defining a wall of the mixing chamber, the surface having a plurality of recesses formed therein.

10. The die according to claim 1 wherein a portion of the first mold defining a surface of the exit portion has a recess formed therein.

11. The die according to claim 1 wherein a portion of the second mold defining a surface of the exit portion has a recess formed therein.

12. A die for reinforcing a resin with fibers, the die comprising first and second molds having heating elements, the second mold clamped to the first mold to define a passageway having an entrance portion, an exit portion, and a mixing chamber situated between the entrance portion and the exit portion, the first mold having a recess and the second mold having a protrusion extending into the recess of the first mold to angle a portion of the passageway between the entrance portion and the mixing chamber, the angle generally being greater than about 90 degrees with respect to a direction in which the fibers may be drawn along an axis through the entrance portion.

13. The die according to claim 12 wherein the protrusion extending from the second mold has a surface defining a wall of the mixing chamber, the surface having a recess formed therein.

\* \* \* \* \*